United States Patent [19]

Vink et al.

[11] Patent Number: 6,011,642
[45] Date of Patent: Jan. 4, 2000

[54] ELECTROCHROMIC ELEMENT, A DISPLAY DEVICE PROVIDED WITH SAME AND A METHOD OF MANUFACTURING AN ELECTROCHROMIC LAYER

[75] Inventors: Teunis J. Vink; Erik P. Boonekamp; Roy G. F. A. Verbeek, all of Eindhoven, Netherlands

[73] Assignee: U.S. Philips Corporation, New York, N.Y.

[21] Appl. No.: 09/059,279

[22] Filed: Apr. 13, 1998

[30] Foreign Application Priority Data

Apr. 18, 1997 [EP] European Pat. Off. .............. 97201146

[51] Int. Cl.[7] .............................. G02F 1/153; G02F 1/15; C23C 14/08; C23C 14/34
[52] U.S. Cl. .......................... 359/273; 359/265; 359/274; 204/192.26
[58] Field of Search ................................. 359/265, 269, 359/273, 274; 204/192.26

[56] References Cited

U.S. PATENT DOCUMENTS

| | | | |
|---|---|---|---|
| 4,889,414 | 12/1989 | Rauh et al. .............................. | 359/265 |
| 4,960,323 | 10/1990 | Demiryont .............................. | 359/265 |
| 4,960,324 | 10/1990 | Brown ..................................... | 350/357 |
| 5,034,246 | 7/1991 | Mance et al. ........................... | 427/106 |
| 5,130,841 | 7/1992 | Demiryont .............................. | 359/265 |
| 5,138,481 | 8/1992 | Demiryont .............................. | 359/269 |
| 5,209,871 | 5/1993 | Mason ..................................... | 252/500 |
| 5,253,101 | 10/1993 | Demiryont .............................. | 359/373 |
| 5,352,505 | 10/1994 | Krisko et al. ........................... | 428/216 |
| 5,520,851 | 5/1996 | Yu et al. .................................. | 252/518 |

*Primary Examiner*—Georgia Epps
*Assistant Examiner*—Margaret Burke
*Attorney, Agent, or Firm*—Norman N. Spain

[57] ABSTRACT

The electrochromic element (20) comprises a substrate (28) and an electrochromic layer (25) having a thickness d on the basis of a metal oxide selected from the group formed by tungsten oxide, molybdenum oxide, niobium oxide, manganese oxide and zirconium oxide, or combinations thereof. The electrochromic layer (25) is characterized in that the oxygen content in the layer (25) varies across the thickness d of the layer (25). Preferably, the variation of the oxygen content in the layer (25) comprises at least two local maxima and a local minimum. Preferably, the electrochromic layer (25) is composed of a plurality of sub-layers (25', 25", 25'"), with the variation of the oxygen content in the layer (25) occurring predominantly at the location of transitions between two sub-layers. Preferably, the electrochromic layer (25) comprises the metal oxide tungsten oxide $WO_x$. The electrochromic element may be provided on the display screen of a display device. A description is given of a method of manufacturing the electrochromic layer (25).

16 Claims, 6 Drawing Sheets

ELECTROCHROMIC ELEMENT, A DISPLAY DEVICE PROVIDED WITH SAME AND A METHOD OF MANUFACTURING AN ELECTROCHROMIC LAYER

BACKGROUND OF THE INVENTION

The invention relates to an electrochromic element comprising a substrate and an electrochromic layer having a thickness d on the basis of a metal oxide selected from the group consisting of tungsten oxide, molybdenum oxide, niobium oxide, manganese oxide and zirconium oxide or combinations thereof, the transmission properties of the electrochromic layer in the visible range being governed by an applied voltage difference across the electrochromic layer.

The invention also relates to a display device provided with a display screen and an electrochromic element.

The invention further relates to a display device comprising a plurality of pixels including an electrochromic element.

The invention further relates to a method of manufacturing an electrochromic layer on the basis of a metal oxide selected from the group composed of tungsten oxide, molybdenum oxide, niobium oxide, manganese oxide and zirconium oxide or combinations thereof, the transmission properties of the electrochromic layer in the visible range being governed by an applied voltage difference across the electrochromic layer, said electrochromic layer being provided by means of a sputter-deposition process in an evacuated chamber.

Electrochromic elements for varying the transmission of light are used to influence the transmission and/or reflection of (visible) light, for example, of lamps, of rear view mirrors and of sunroofs for cars, or of windows for buildings (smart windows), or of lenses, or of spectacle lenses for (sun) glasses. They are also used on the viewing side of display windows of (flat-panel) display devices, such as cathode ray tubes (CRTs), plasma display panels (PDPs) and liquid-crystal display devices (LCDs, LC-TVs and plasma-addressed LCDs) to improve the contrast of the image reproduced. By virtue thereof, the feasibility of readily bringing the light transmission to a desired value is increased and, for example, the necessity of changing the glass composition of the display window of a display device is avoided.

The electrochromic elements mentioned in the opening paragraph influence the intensity of reflected ambient light and the intensity of light originating from an (internal) light source, such as the phosphors in a CRT. Incident ambient light passes through the electrochromic element and is reflected at the substrate or at the phosphors of color filters in a CRT, whereafter the reflected light passes through the electrochromic element again. If the transmission of the electrochromic element amounts to T, the intensity of the reflected ambient light decreases by a factor of $T^2$. Light originating from the internal light source(s), however, passes through the electrochromic element only once, so that the intensity of this light decreases only by a factor of T. The combination of these effects leads to an increase of the contrast by a factor of $T^{-1}$.

Oxides of specific transition metals are capable of accepting guest atoms such as hydrogen and alkali-metal atoms. If the oxide forms part of an electrochemical cell (the electrochromic element), the guest atoms can be accepted and released again in a reversible manner. In general, an electrochromic element comprises a first (transparent, conductive) electrode which is connected to an electrochromic layer, the so-called work electrode, and a second (transparent, conductive) electrode, the so-called counter electrode, which contains a material which serves as a source and as an acceptor for the guest atoms, and an ion-conducting (liquid, polymeric or solid) material, the so-called electrolyte, being present between said two electrodes. The transmission properties of the electrochromic element in the visible range undergo a change when a voltage difference is applied across the electrochromic element. As the variation in light is often detected via a light sensor provided in the vicinity of the electrochemical cell, this is referred to as an indirect response to a variation in light.

An electrochromic element of the type mentioned in the opening paragraph disclosed in United States patent U.S. Pat. No. 4,824,222. In said patent, a description is given of an electrochromic element which comprises an electrochromic layer containing molybdenum oxide ($MoO_3$), tungsten oxide ($WO_3$), zirconium oxide ($ZrO_2$) or niobium oxide ($Nb2O_5$), or combinations thereof, as the electrochromic metal oxide.

Such electrochromic elements often have the disadvantage that their transmission spectrum is not color neutral when the voltage difference is applied across the electrochromic layer (the so-called "colored" state).

SUMMARY OF THE INVENTION

It is an object of the invention to provide, inter alia, an electrochromic element which comprises an electrochromic layer of the type mentioned in the opening paragraph, and the color neutrality of which is improved. The invention further aims at providing a simple method of manufacturing such an electrochromic layer.

To achieve this, the electrochromic element in accordance with the invention is characterized in that the oxygen content in the electrochromic layer varies across the thickness of said electrochromic layer.

Since, in accordance with the measure of the invention, the oxygen content of the electrochromic layer varies across the thickness d of the layer (this is brought about by varying the oxygen content in the course of the manufacture of the layer), a metal oxide which is not stoichiometric is obtained. For example, if a stoichiometric metal oxide has the structural formula $MO_3$, a non-stoichiometric metal oxide $MO_x$ has an average oxygen content below three, in other words, in the structural formula $MO_x$, x has a value <3. By varying the oxygen content of the electrochromic layer across the thickness d of the layer, a change in the so-called band gap of the metal oxide is brought about, which leads to a change of the spectral transmission of the metal oxide. The surprising result of the measure in accordance with the invention is that, in the colored state (when the voltage difference is applied across the electrochromic element and the layer is intercalated), the metal oxide is not (dark-)colored (for example, in the colored state, electrochromic tungsten oxide exhibits a characteristic (deep-)blue color) but is of a color-neutral grey color instead.

In the known electrochromic element, appropriate concentrations of suitable guest materials (for example oxides of (transition) metals such as $V_2O_5$ or $TiO_2$) are added to the metal oxide to reduce the undesirable coloration of the metal oxide in the colored state. Such additions have the disadvantage that the materials added are relatively expensive, the incorporation of same in the metal oxide requires additional process steps and, in addition, that such additions to the metal oxide reduce the transmission of the electrochromic element in the uncolored state. Besides, in general, prolonged investigations are necessary to find out which concentration of which materials yields the desired effect.

An embodiment of the electrochromic element in accordance with the invention is characterized in that the variation of the oxygen content in the electrochromic layer comprises at least two local maxima and a local minimum. A variation of the oxygen content in the electrochromic layer means that, if the structural formula of the metal oxide is indicated by $MO_x$, in which, for example, x=3 corresponds to the stoichiometric form of the metal oxide, the value of x varies across the layer. The variation of x across the electrochromic layer goes from a maximum, where the oxygen content is relatively high (for example x≠3 or x≠2.5) via a minimum, where the oxygen content is relatively low (for example x≠2 or x≠1) to a further maximum, where the oxygen content is high again. The electrochromic layer comprises, as it were, a (local) region in which the oxygen content is lower than in the surrounding regions. Preferably, the variation of the oxygen content in the electrochromic layer comprises at least a plurality of local maxima alternated with an (at least substantially corresponding) number of local minima.

An embodiment of the electrochromic element in accordance with the invention is characterized in that the layer comprises a plurality of sub-layers in which the oxygen content varies from sub-layer to sub-layer. By (regularly) varying the oxygen content (during the manufacture of the layer), an electrochromic layer on the basis of the metal oxide is obtained, in which the oxygen content of the layer varies (regularly). The spectral properties of the layer can be influenced in a desirable manner by periodically varying the composition of the electrochromic layer across the thickness d of the layer. Preferably, the layer exhibits a reduced oxygen content, predominantly, at the location of the transitions between two sub-layers. In this manner, a stack of sub-layers is formed, which sub-layers themselves comprise, predominantly, at least substantially stoichiometric metal oxide (for example $MO_3$), while the metal oxide at (or in the vicinity of) the transitions between the sub-layers comprises non-stoichiometric metal oxide ($MO_x$, wherein x<3). In this manner, the transitions between the layers form a region in which, locally, the oxygen content of the electrochromic layer is lower (for example as a result of an oxygen depletion during the manufacture of the layer). In this manner, a thicker layer of electrochromic metal oxide is reproducibly obtained, which layer exhibits the desired color-neutral properties in the colored state.

Preferably, the metal oxide comprises tungsten oxide. Upon the application of the voltage difference (referred to as "intercalating") across the electrochromic layer, the known electrochromic tungsten oxide ($WO_3$) undergoes a reversible change from (colorless) transparent in the so-called bleached state to dark-colored blue in the so-called colored state. The inventors have recognized that the measure in accordance with the invention ensures that, upon the application of a voltage difference, a reversible change from (colorless) transparent in the bleached state to color-neutral grey in the colored state occurs. As a result, the incorporation of other metal oxides (such as vanadium oxide and titanium oxide) in the electrochromic tungsten oxide to reduce the characteristic blue color of the tungsten oxide in the colored state has become superfluous.

An embodiment of the electrochromic element in accordance with the invention is characterized in that upon the application of the voltage difference, the electrochromic layer exhibits such a spectral characteristic that the difference between the maximum transmission $T_{max}$ and the minimum transmission $T_{min}$ of the electrochromic layer in the visible range is less than 35% of the sum of $T_{max}$ and $T_{min}$, that is, in formulated form:

$$\frac{T_{\max} - T_{\min}}{T_{\max} + T_{\min}} \leq 0,35.$$

The degree to which the color neutrality of the metal oxide in the colored state is expressed is determined, in this application, by measuring the spectral characteristic of the metal oxide (tungsten oxide) when the voltage difference is applied. For this purpose, in particular, the variation of the transmission curve of the metal oxide in the visible range is experimentally measured. In general, the visible range comprises the following wavelength range: 400≤λ≤780 nm, wherein λ is the wavelength of the light. In general, the measured transmission curve exhibits a maximum value $T_{max}$ and a minimum value $T_{min}$ in the visible range. In order to obtain a measure of the flatness of the transmission curve, which is relatively independent of the average transmission value in the visible range, the ratio $\Delta T_{rel}$ of the difference between the maximum and the minimum transmission to the sum of the maximum and the minimum transmission is determined, that is, in formulated form:

$$\Delta T_{rel} = \frac{T_{\max} - T_{\min}}{T_{\max} + T_{\min}}.$$

The known tungsten oxide, which, in the colored state, exhibits the characteristic blue color, said ratio $\Delta T_{rel}$ generally exceeds 0.4. For example, in the case of a measurement in the colored state of stoichiometric $WO_3$, the following values are found: $T_{max}$≠0.3 and $T_{min}$≠0.1, so that $\Delta T_{rel}$≠0.5. In this case, the maximum value of the transmission (evidently) occurs on the "blue side" of the visible range (λ≠400 nm), while the transmission from said "side" decreases gradually in the direction of the "red side" of the visible range (λ≠780 nm), where the transmission is minimal. Such a variation in spectral characteristic of the known electrochromic element, used to reduce the reflection of visible light, causes the color rendition of an image passed by the electrochromic element to be disturbed. In particular, the color rendition of the skin of persons is adversely influenced thereby, resulting in an "unhealthy" appearance of these persons.

By contrast, an electrochromic element in accordance with the above embodiment of the invention has a relatively good color-neutral appearance in the colored state as said ratio $\Delta T_{rel}$ is below 0.35. For example, if use is made of the non-stoichiometric $WO_x$ in accordance with the invention, the following maximum and minimum transmission values are measured: $T_{max}$≠0.2 and $T_{min}$≠0.1. Consequently, $\Delta T_{rel}$≠0.3. In this case, the maximum value of the transmission in the visible range occurs at a wavelength λ≠500 nm, while the transmission is minimal at approximately λ≠750 nm.

A further improvement of the color neutrality of the electrochromic element is obtained if the difference between the maximum transmission $T_{max}$ and the minimum transmission $T_{min}$ of the electrochromic layer in the visible range is less than 20% of the sum of $T_{max}$ and $T_{min}$, in other words, $\Delta T_{rel}$≤0.2. As a result, the transmission curve in the visible range, in the colored state, becomes at least substantially "flat". For example, if use is made of non-stoichiometric $WO_x$ in accordance with the invention, the following maximum and minimum transmission values are measured: $T_{max}\neq 0.15$ and $T_{min}\neq 0.1$. Consequently, $\Delta T_{rel}\neq 0.14$. In this case, the maximum value of the transmission in the visible range occurs at a wavelength $\lambda\neq 500$ nm, while the transmission is minimal at approximately $\lambda\neq 750$ nm. Such a variation in spectral characteristic of such an electrochromic element which is used to reduce the reflection of visible light of a display device leads to an excellent color rendition, for example, of the image displayed on the display window of the display device, and, in particular, also the color rendition of the skin of persons being such that the desired "healthy" appearance is achieved in the image displayed.

A further embodiment of the electrochromic element in accordance with the invention is characterized in that the oxygen content of the $WO_x$ ranges between $0\leq x\leq 3$. The stoichiometry of the $WO_x$ may vary over a wide range. A precondition which must be met is that the electrochromic character of the layer is preserved. The variation in stoichiometry may signify that a part of the $WO_x$ layer does not comprise oxygen (x=0) and that another part of the $WO_x$ layer comprises stoichiometric oxygen (x=3). Preferably, the oxygen content of the $WO_x$ ranges between $1\leq x\leq 3$. Undesirable absorption of (visible) light by the electrochromic layer is precluded by avoiding parts in the layer which do not, or hardly, contain oxygen (x<1).

It is desirable that, depending on the applied voltage difference across the electrochromic layer in accordance with the invention, said electrochromic layer should have a color-neutral appearance at all stages between (colorless) transparent in the bleached state (transmission of the layer$\neq 90\%$) and (color-neutral) (dark-)grey in the (maximally) colored state (transmission of the layer$\leq 10\%$).

The object of providing a simple method of manufacturing an electrochromic layer on the basis of a metal oxide selected from the group formed by tungsten oxide, molybdenum oxide, niobium oxide, manganese oxide and zirconium oxide, or combinations thereof, with said electrochromic layer being provided by means of a sputter-deposition process in an evacuated chamber, is achieved by a method as described in the opening paragraph, which method is characterized in that during the provision of the electrochromic layer, the oxygen content in the chamber is varied.

In general, such electrochromic layers are manufactured in a so-called sputter-deposition process. In a sputter-deposition process, a mixture of ions is used in an (evacuated) deposition chamber to bombard a so-called target from which atom-scale particles are released whose energy content is sufficient to reach the substrate. Oxidation of the layers is brought about by admitting the desirable quantity of oxygen to the deposition chamber during sputtering (reactive sputtering). The desirable non-stoichiometric properties of the metal oxide are obtained by varying the oxygen content during the provision of the layer in a controlled manner, the electrochromic layer manufactured in accordance with the invention exhibiting the desired spectral characteristic of the electrochromic layer.

Preferably, during the deposition process, the oxygen content is varied, in such a manner that the variation of the oxygen content in the electrochromic layer comprises at least two local maxima and a local minimum. Preferably, the electrochromic layer provided during the deposition process comprises tungsten oxide $WO_x$.

In an embodiment of the method in accordance with the invention, the oxygen content is varied, during the manufacture of the $WO_x$, in such a manner that the oxygen content of the layer varies between $0\leq x\leq 3$. Preferably, the oxygen content of the layer ranges between $1\leq x\leq 3$.

By (regularly) varying the oxygen content during the manufacture of the layer, an electrochromic layer on the basis of tungsten oxide is formed in which the oxygen content varies (regularly). In this manner, a stack of sub-layers is obtained which are partly stoichiometric and partly non-stoichiometric. Preferably, the oxygen content is varied in such a manner that the layer exhibits a reduced oxygen content predominantly at the location of the transitions from a sub-layer to a subsequent sub-layer. In this manner, a stack of sub-layers is obtained, which sub-layers themselves predominantly comprise at least substantially stoichiometric $WO_3$, while the tungsten oxide at (or in the vicinity of) the transitions between the sub-layers comprises non-stoichiometric $WO_x$. By varying the oxygen content in the evacuated chamber in a regular manner during the manufacture of the electrochromic layer, sufficient non-stoichiometric $WO_x$ is obtained to preclude undesirable color effects during the transition from the bleached state to the colored state.

BRIEF DESCRIPTION OF THE DRAWING

In the drawings.

The Figures are purely diagrammatic and not drawn to scale. Particularly for clarity, some dimensions are exaggerated strongly. Similar components in the Figures beer identical reference numerals, where possible.

DETAILED DESCRIPTION OF THE INVENTION

The invention will now be described in greater detail with reference to the figures of the drawing.

Figure 1A:
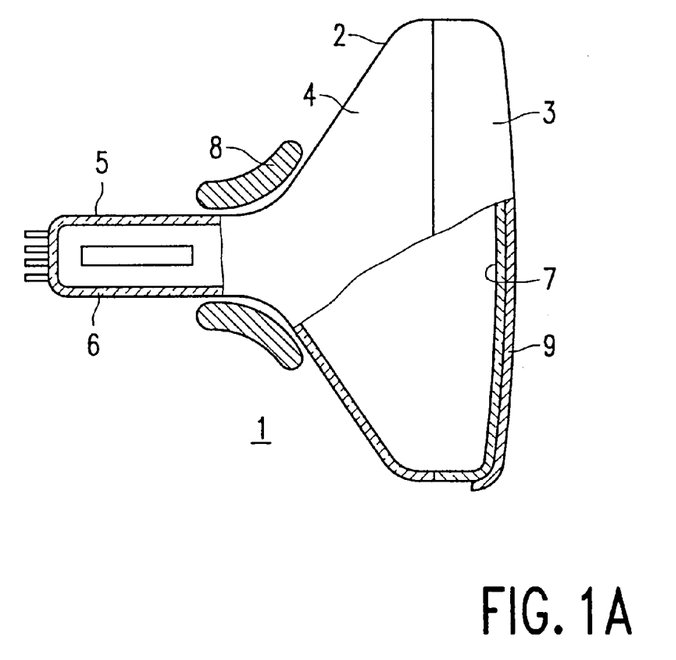
FIG. 1A is a partly cut-away view of a display device comprising a cathode ray tube provided with an optical element in accordance with the invention.

FIG. 1A is a schematic, cut-away view of a display device comprising a cathode ray tube (CRT) 1 having a glass envelope 2 including a display window 3, a cone 4 and a neck 5. An electron gun 6 for generating one or more electron beams is situated in said neck. Said electron beam (s) is (are) focused on a phosphor layer 7 on the inner surface of the display window 3 and is (are) deflected across said display window 3 in two mutually perpendicular directions by means of a deflection coil system 8. On the outer surface, the display window 3 of the display device 1 is provided with an electrochromic element 9 in accordance with the invention. Preferably, the electrochromic element is directly provided on the outer surface of the display window of the display device (see FIG. 1A). In an alternative embodiment, the optical element is provided on a (flat) so-called front panel which is arranged on the viewing side of the display device in front of the display window.

Such optical elements can also be used on the viewing side of display windows of other (flat) (picture) display devices, such as plasma display panels (PDPs) and liquid-crystal display devices (LCDs, LC-TVs and plasma-addressed LCDs) to improve the contrast of the image reproduced.

Figure 1B:
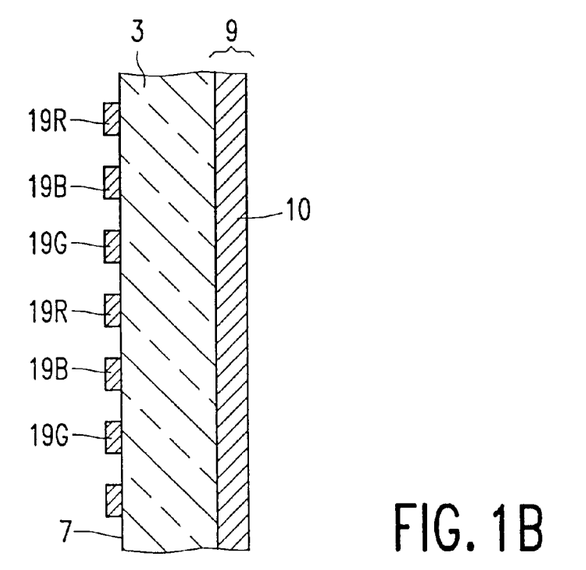
FIG. 1B is a cross-sectional view of a detail of FIG. 1A.

FIG. 1B is a cross-sectional view of a detail of FIG. 1A, in which the phosphor layer 7 on the inner surface of the display window 3 comprises a regular pattern of (electro-) luminescent spots 19R, 19G, 19B. Said spots 19R, 19G, 19B each contain a suitable phosphor of the right color: red 19R, green 19G or blue 19B. Preferably, the outer surface of the display window 3 is provided with an electrochromic element 9 having a variable transmission. Element 9 at least comprises an electrochromic layer 10 in accordance with the invention on the basis of tungsten oxide $WO_x$. One of the properties of the electrochromic element 9 is that the transmission properties in the visible range vary indirectly as a result of variations in ambient light (indirect response to a variation in light). The layer 10 may comprise one or more layers.

In order to be able to react rapidly to variations in the intensity of ambient light, a change in the transmission of the electrochromic layer 10 of the electrochromic element 9 as a result of a variation in the intensity of ambient light, takes place in less than 5 minutes, preferably less than 1 minute. Preferably, the electrochromic layer 10 (in the state in which the transmission of the layer is high) is insensitive to luminous flux densities below 10 lux, preferably below 100 lux.

Figure 2A:
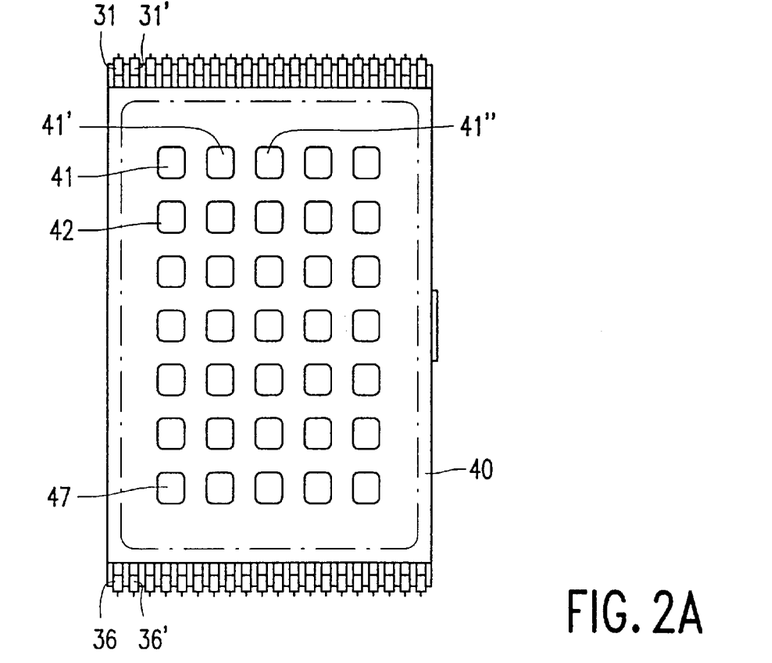
FIG. 2A is an example of a display device comprising a plurality of pixels including an electrochromic element in accordance with the invention.

FIG. 2A is a highly schematic view of a display device comprising a plurality of pixels including an electrochromic element in accordance with the invention. In this example, the display device comprises an array of 5×7 pixels 41, 41', 41"; 42; 47 which are provided on a substrate 40 (for example a pyrex glass plate) and arranged in accordance with a regular (rectangular) pattern. Each one of the pixels comprises an electrochromic element with an electrochromic layer in accordance with the invention and is connected via conductor paths, which are not shown in FIG. 2A, to electric contacts 31, 31'; 36, 36' via which the desired voltage is applied across the electrochromic element. If a voltage difference is applied across one of the electrochromic elements, the electrochromic layer switches to the colored state (color-neutral black/grey) or the electrochromic layer is decolorized to the bleached (transparent) state. In this manner, by simultaneously selecting a number of electrochromic elements all letters of the alphabet and the arabic numerals can be formed.

Figure 2B:
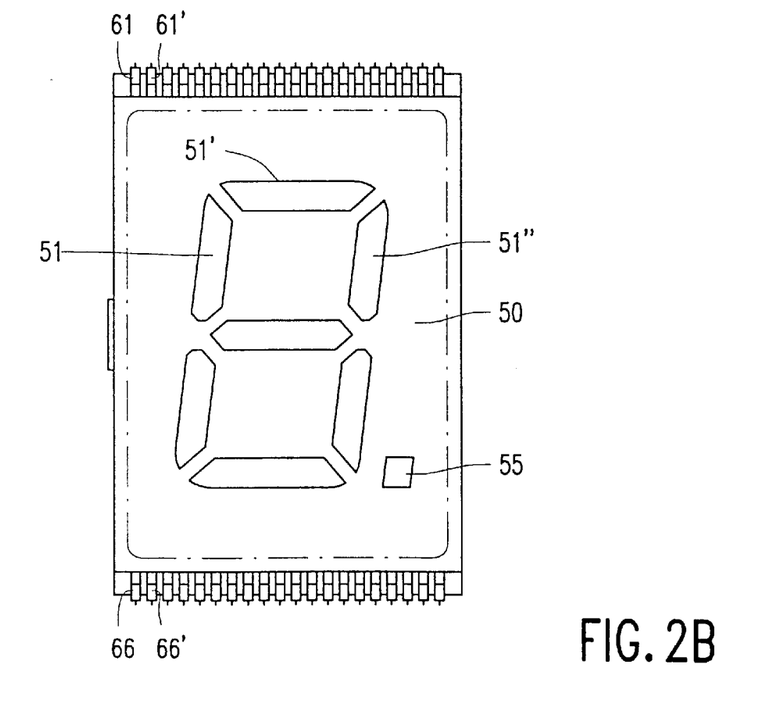
FIG. 2B is a further example of a display device comprising a plurality of pixels including an electrochromic element in accordance with the invention.

FIG. 2B shows an alternative display device comprising a plurality of pixels including an electrochromic element in accordance with the invention. In this example, the display device comprises an array of 7+1 pixels 51, 51', 51"; 55 which are provided on a substrate 50. Each one of the pixels comprises an electrochromic element having an electrochromic layer in accordance with the invention and is connected, via conductor paths which are not shown in FIG. 2B, to electric contacts 61, 61'; 66, 66' via which the desired voltage is applied across the electrochromic element. In this manner, by simultaneously selecting a number of the electrochromic elements 51, 51', 51" all arabic numerals, including a point (element 55) can be formed.

The advantage of the embodiments shown in FIGS. 2A and 2B is that switching of the electrochromic elements can be brought about with relatively low voltages (±1.5 V). A good memory effect of the electrochromic element enables, after switching of the relevant pixel, the voltage to be switched off until a subsequent display on the display device is desired. As the switching times between the bleached and the colored state are less than 1 minute, such displays can very suitably be used to display data-graphic information (for example in arrival or departure halls of railway stations or airports, or as means for displaying different messages/advertisements.

Figure 3:
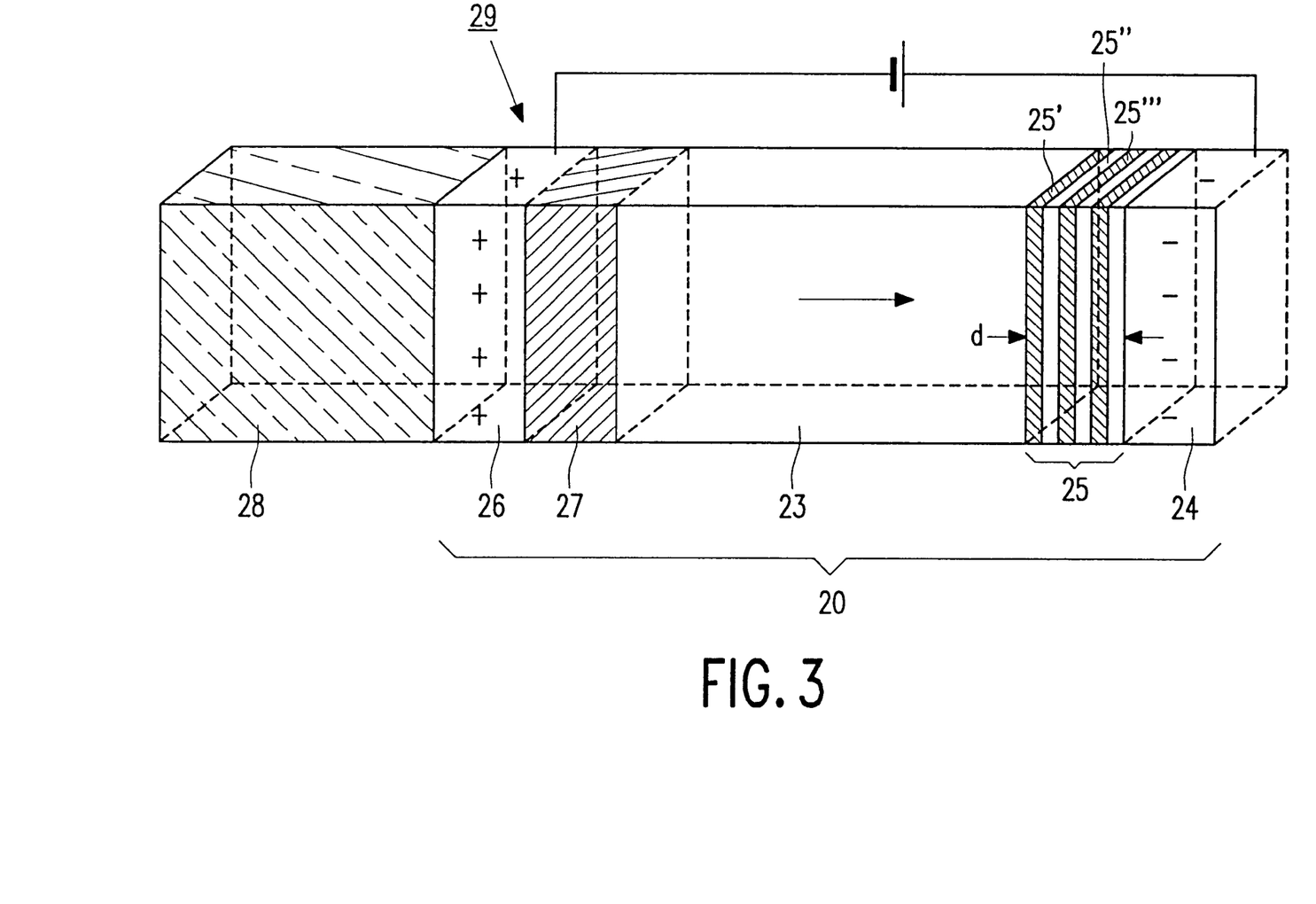
FIG. 3 is a partly perspective view of an example of an electrochromic element comprising an electrochromic layer in accordance with the invention.

FIG. 3 is a highly schematic, partly perspective view of an example of an electrochromic element 20 comprising an electrochromic layer 25 in accordance with the invention. Said electrochromic element includes two half cells, which are interconnected ("laminated") via an electrolyte 23. The first half cell comprises a transparent conductor 24, for example ITO (indium tin oxide) and an electrochromic layer 25 in accordance with the invention, which layer predominantly comprises a metal oxide of the group formed by tungsten oxide, molybdenum oxide, niobium oxide, manganese oxide and zirconium oxide, and which layer is also referred to as work electrode. In the example shown in FIG. 3, it is schematically indicated that the electrochromic layer 25 is composed of a plurality of sub-layers 25', 25", 25''', in which the oxygen content in accordance with the invention varies from sub-layer to sub-layer. Preferably, in particular, the transitions from one sub-layer to the next sub-layer exhibit a reduced oxygen content, and the central part of the sub-layers comprises at least substantially stoichiometric $WO_3$.

The second half cell comprises a transparent substrate 28, for example glass, which supports a transparent conductor 26, for example ITO, and a so-called ion storage layer 27, also referred to as counter electrode. A voltage difference is applied between the transparent conductors 24 and 26 (typically ±1.5 V). The counter electrode 27 generally is responsible only for storing and releasing guest ions, such as hydrogen ions ($H^+$) and alkali-metal ions, such as $Li^+$ ions and usually does not contribute, or only to a small extent, to the change in color of the electrochromic element (for example if the counter electrode 27 comprises the material cerium oxide ($CeO_x$)). The ion conductor is responsible for a rapid transfer of the guest ions and, preferably, has a high resistance to electroconduction by electrons (in FIG. 3, the movement of the ions is indicated by an arrow). The metal oxide in the electrochromic layer 25 serves to ensure that the transmission properties, upon applying a voltage difference across the element, undergo a reversible change from (colorless) transparent to (color-neutral) dark-colored.

If the two half cells are laminated via a polymeric electrolyte 23, for example a mixture of poly-ethylene-oxide (PEO), poly-methyl-metha-acrylate (PMMA) and a specific quantity of $LiClO_4$, the thickness of the polymeric electrolyte 23 is approximately 1–1000 μm. In a so-called "all solid-state" electrochromic element, the electrolyte 23 is formed by a (coating) layer of a transition metal, such as $Ta_2O_5$ or $LiNbO_3$. In the case of a solid-state electrochromic element, said element can be provided in the form of a system of (coating) layers on the substrate 28 by means of known techniques, and the thickness of the electrolyte is, for example, 0.3 μm. Said known deposition techniques include spinning, sol-gel processing, CVD (chemical vapor deposition), vapor deposition (PVD physical vapor deposition) and (reactive) sputtering, and combinations thereof.

Figure 4:
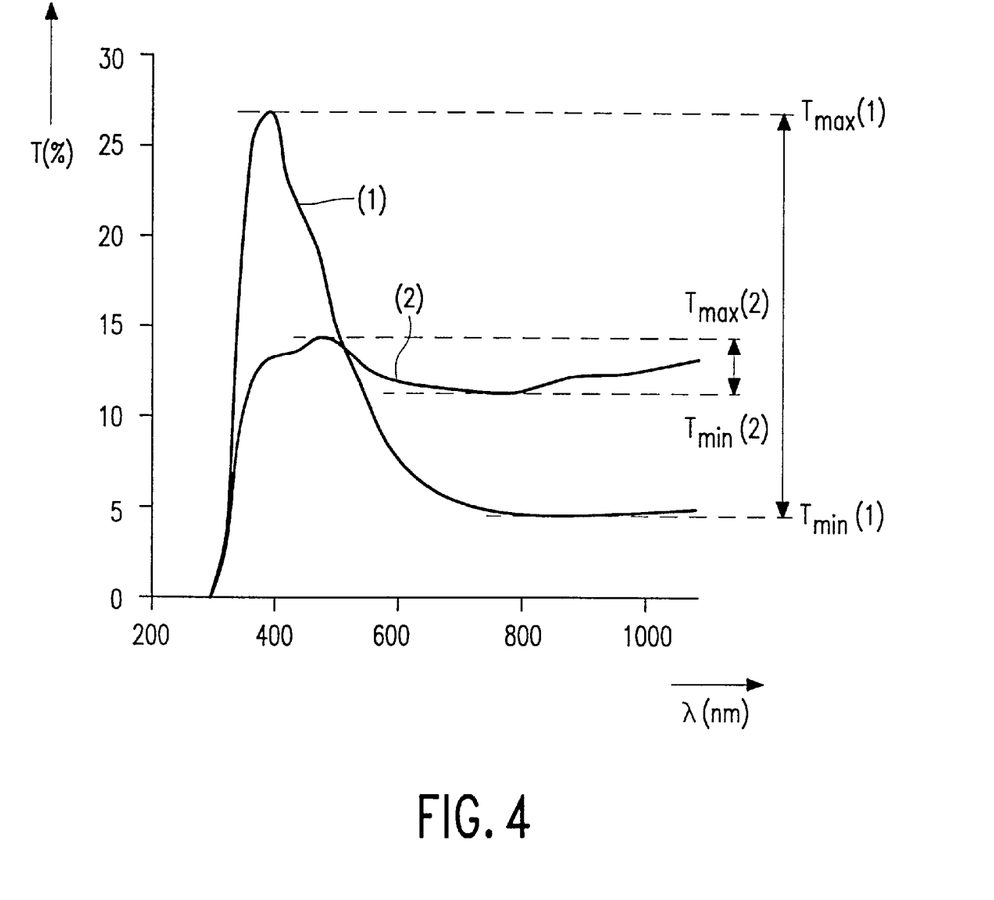
FIG. 4 shows the transmission spectra, as a function of the wavelength $\lambda$ in the visible range, of an electrochromic element in the colored state which is made from the known tungsten oxide and from tungsten oxide in accordance with the invention.

FIG. 4 shows the transmission spectra (T in %), as a function of the wavelength λ (λ in nm) in the visible range, of an electrochromic element in the colored state, in which Figure, curve 1 shows the known tungsten oxide and curve 2 shows tungsten oxide in accordance with the invention. The known tungsten oxide (curve 1) exhibits a transmission spectrum with the characteristic deep-blue color ($T_{max} \neq 0.27$, $T_{min} \neq 0.04$, $\Delta T_{rel} \neq 0.74$). In this example, the tungsten oxide $WO_x$ in accordance with the invention (curve 2) has a $T_{max} \neq 0.14$, $T_{min} \neq 0.11$, so that $\Delta T_{rel} \neq 0.12$, which is below the upper limit of $\Delta T_{rel} < 0.35$ and below the preferred limit of $\Delta T_{rel} < 0.2$.

Figure 5A:
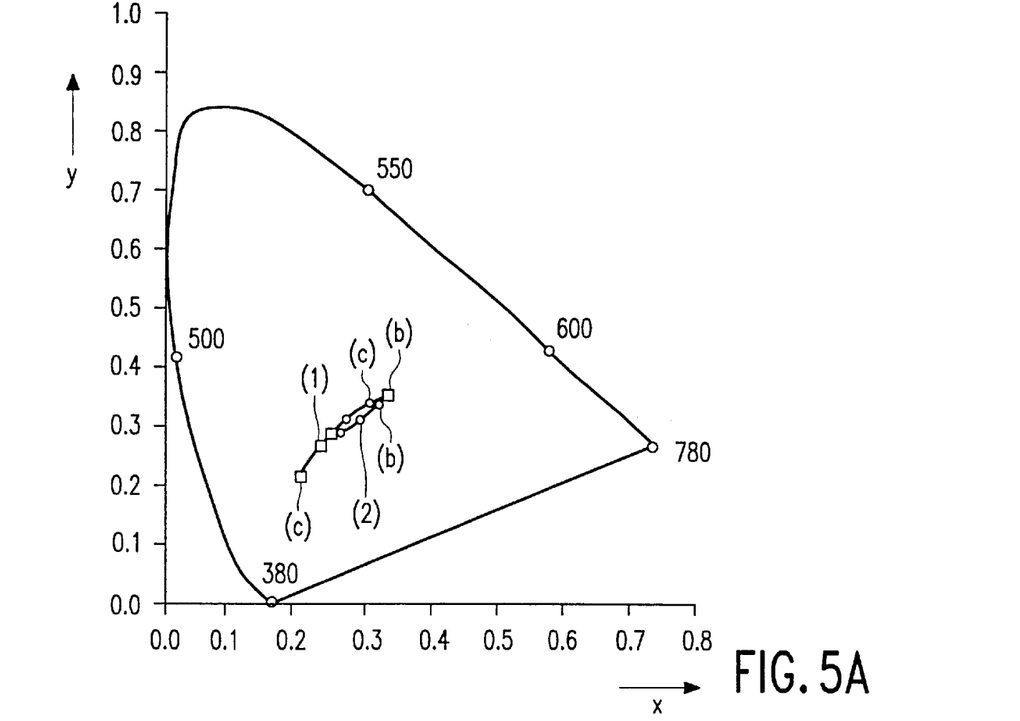
FIGS. 5A and 5B show, in a C.I.E. 1931 color triangle, the color co-ordinates of an optical element which comprises an electrochromic element of the known tungsten oxide and of tungsten oxide in accordance with the invention.

FIG. 5A shows in a C.I.E. 1931 color triangle, the color co-ordinates (x;y) of an optical element comprising an electrochromic element, in which Figure, curve 1 shows the known tungsten oxide and curve 2 shows the tungsten oxide in accordance with the invention. The numbers which correspond to the circles on the edge of the color triangle correspond to the wavelengths of monochromatic visible light in nm. The so-called "white" point (not shown in FIG. 5A) is the point in the center of the color triangle which corresponds to a color co-ordinate of (0.333; 0.333). For clarity, FIG. 5B shows a region in the color triangle around $0.2 \leq (x;y) \leq 0.4$ on an enlarged scale.

Figure 5B:
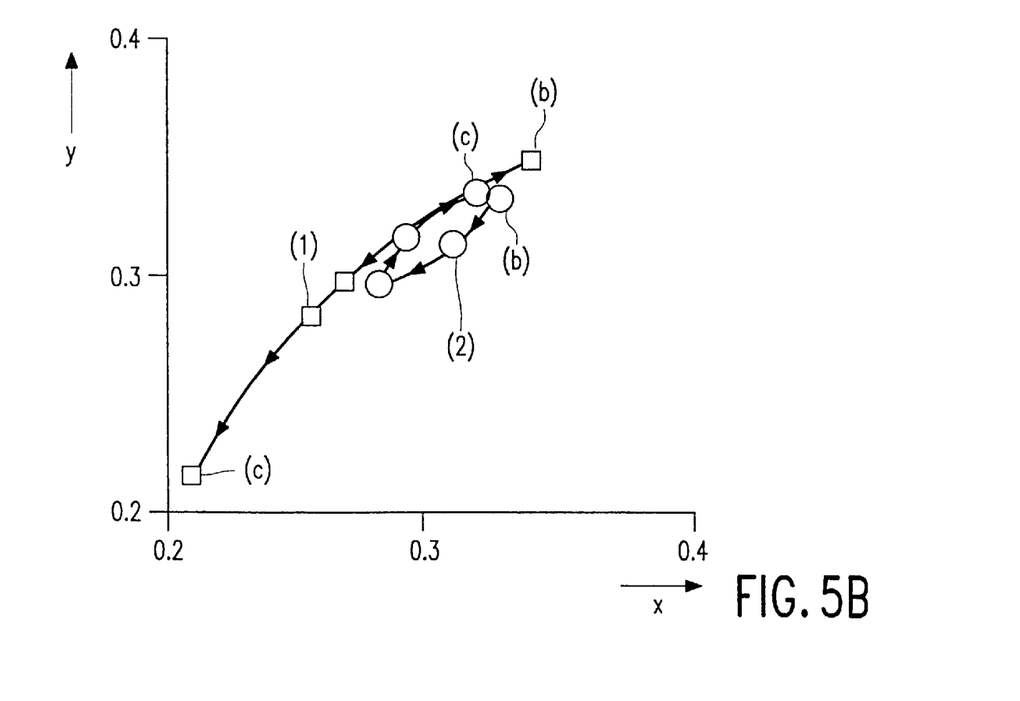

In FIGS. 5A and 5B, the color points (open squares) situated on curve 1 correspond to the color co-ordinates of the known tungsten oxide. In the bleached state (indicated by b in curve 1), the color point of the known electrochromic $WO_3$ layer substantially coincides with the "white" point of the color triangle. During the application of the voltage difference across the known electrochromic layer (referred to as intercalating) the transmission of the $WO_3$ layer decreases and the layer assumes a dark-blue color (see "colored state", indicated by c in curve 1). In FIGS. 5A and 5B, the color points (open circles) situated on curve 2 correspond to the color co-ordinates of the tungsten oxide in accordance with the invention. In the bleached state (indicated by b in curve 2), the color point of the electrochromic $WO_3$ layer in accordance with the invention substantially coincides with the "white" point of the color triangle. During the application of the voltage difference across the electrochromic layer in accordance with the invention (referred to as intercalating) the transmission of the $WO_3$ layer decreases and the color point remains in the so-called white region around the "white" point (see "colored state", indicated by c in curve 2).

The electrochromic layer in accordance with the invention is sufficiently color neutral at all stages if the electrochromic layer exhibits such a spectral characteristic that, as a result of the application of the voltage difference across the layer, color co-ordinates (x;y) of the electrochromic layer vary in such a manner that a line interconnecting the color co-ordinates (x;y) in a C.I.E. 1931 color triangle is partly situated in an elliptical area with middle point (0.333; 0.333) in the color triangle, which ellipse has a long axis and a short axis, with the long axis terminating in (0.30; 0.28) and (0.36; 0.38), and the ratio of the length of the long axis to the length of the short axis ranging between 2 and 3.

Figure 6A:
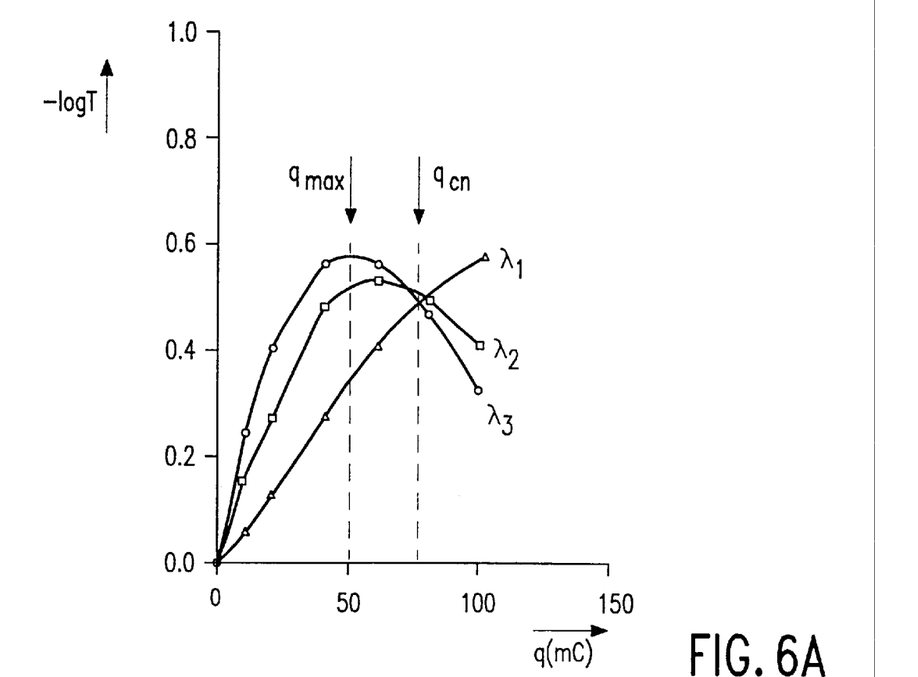
FIGS. 6A and 6B show the negative logarithm of the transmission as a function of the intercalated charge of electrochromic tungsten oxide in accordance with the invention in different intercalation states.

FIG. 6A shows the negative logarithm of the transmission (−log T) as a function of the intercalated charge q (q in mC) of the electrochromic tungsten-oxide $WO_x$ in accordance with the invention. $Li^+$ is intercalated into the tungsten oxide until the grey point is reached. The transmission of the electrochromic layer is determined at the following wavelengths $\lambda_1 = 400$ nm (open triangles), $\lambda_2 = 600$ nm (open squares), and $\lambda_3 = 1000$ nm (open circles). The three transmission curves substantially coincide at a point (the so-called "grey point") indicated by $q_{cn} \neq 75$ mC, at which value the layer is (perfectly) color neutral (cn). The maximum absorption in the electrochromic layer occurs at an (imaginary) vertical line which is indicated in FIG. 6A by $q_{max} \neq 50$ mC, at which value (after conversion) $T_{max} \neq 0.45$ and $T_{min} \neq 0.26$, so that $\Delta T_{rel} \neq 0.27$, which is situated below the upper limit of $\Delta T_{rel} < 0.35$.

Figure 6B:
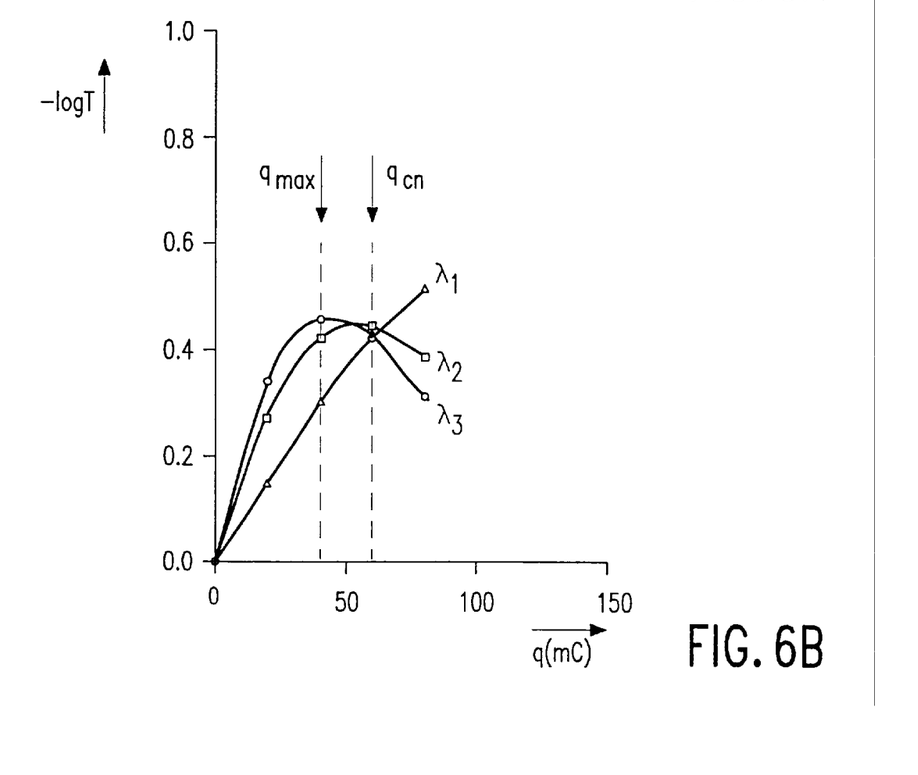

If the electrochromic layer is subject to intercalation more than once, the grey point shifts to a lower value of the intercalated charge and the color neutrality of the electrochromic layer in accordance with the invention is improved throughout the charged region. FIG. 6B shows the same dependencies as FIG. 6A, in which former case the film is once again intercalated to a value of 100 mC. This results in a color-neutral point ("grey point") which is indicated by $q_{cn} \neq 60$ mC. The maximum absorption in the electrochromic layer occurs at an (imaginary) vertical line which is indicated, in FIG. 6B, by $q_{max} \neq 40$ mC, at which value (after conversion) $T_{max} \neq 0.50$ and $T_{min} \neq 0.35$, so that $\Delta T_{rel} \neq 0.18$, which is situated below the preferred limit of $\Delta T_{rel} < 0.20$.

EXAMPLE

An example of an electrochromic element 20 is formed by the following system of layers (see Table I and FIG. 3):
a so-called "all solid-state" electrochromic element 20 comprising five layers, namely:
 a first transparent conductor 24 of ITO (indium tin oxide) (thickness≠0.3 μm, refractive index≠2.0),
 a work electrode 25 of $WO_x$ in accordance with the invention (thickness≠0.4 μm, refractive index≠2.0),
 a solid-state electrolyte 23 of $Ta_2O_5$ (thickness≠0.2 μm, refractive index≠2.0),
 a counter electrode 27 of NiO (thickness≠0.3 μm, refractive index≠2.0),
 a second transparent conductor 26 of ITO (indium tin oxide) (thickness≠0.3 μm, refractive index≠2.0).

TABLE I

| Electrochromic element | | | | | | |
|---|---|---|---|---|---|---|
| substrate | ITO | NiO | $Ta_2O_5$ | $WO_3$ | ITO | air |
| n ~ 1, 5 | n ~ 2 ~0, 3 μm | n ~ 2 ~0, 3 μm | n ~ 2 ~0, 2 μm | n ~ 2 ~0, 4 μm | n ~ 2 ~0, 3 μm | n ~ 1 |

To reduce undesirable specular reflections, an anti-reflective layer of $Al_2O_3$ (optical thickness≠¼λ, geometric thickness≠0.1 μm) may be situated (not shown in FIG. 2) between the electrochromic element 20 and the substrate 28. Further undesirable reflections can be precluded by providing a further anti-reflective layer of $SiO_2$ (optical thickness≠¼λ) (not shown in FIG. 3) on the outer surface of the electrochromic element 20.

The electrochromic element is preferably provided on the viewing side of a (display) window (substrate) of a display device. The optical element described in this example is preferably provided by means of sputtering, and the above-mentioned (coating) layers being successively deposited on the substrate in one coating operation. In a sputtering process, a mixture of ions (argon, oxygen; at a characteristic pressure of approximately 1 Pa) is used to bombard a so-called target (for example metallic tungsten, tantalum, nickel, etc.), from which small particles (atomic scale) are released whose energy content is sufficient to reach the substrate (for example the window of a display device). In general, the substrate does not have to be heated to obtain layers having the desired mechanical properties. Oxidation of the layers is brought about by admitting the proper quantity of oxygen to the evacuated deposition chamber during sputtering (reactive sputtering). The target may alternatively consist of metal oxides.

The construction of an electrochromic element is similar to that of a battery, that is, they both comprise two electrodes and an electrolyte sandwiched therebetween (3 active layers). The transmission of the electrochromic element is controlled by applying a voltage difference across the element (±1.5 V). The transmission can be controlled via a light sensor (automatically via a control circuit) or via a remote control operated by the viewer. An electrochromic element can react to light originating from a natural light source as well as to light originating from an artificial light source. If the display device is in the off position (stand-by), the electrochromic element can be set at a specific transmission (for example a minimum transmission to improve the appearance of the display device).

The overall thickness of the electrochromic element 20 described in this example is approximately 1.5 $\mu$m. The overall transmission $T_t$ of the electrochromic element 20 varies in the range from 0.1 to 0.9 ($10 \leq T_t \leq 90\%$). To make the best use of the extremely great dynamic range of the electrochromic element when it is used in (picture) display devices, it is desirable that the transparency of the substrate (display window) should be as high as possible. To achieve this, the transmission of the (display) window of the (picture) display device comprising the electrochromic element is preferably higher than 90%.

It will be obvious that, within the scope of the invention, many variations are possible to those skilled in the art. For example, the electrochromic element can also be combined with anti-reflective, anti-scratch and/or anti-static layers.

We claim:

1. An electrochromic element (20) comprising a substrate (28) and an electrochromic layer (25) having a thickness d on the basis of a metal oxide selected from the group consisting of tungsten oxide, molybdenum oxide, niobium oxide, manganese oxide and zirconium oxide and combinations thereof, the transmission properties of the electrochromic layer in the visible range being governed by an applied voltage difference across the electrochromic layer, characterized in that the oxygen content in the electrochromic layer (25) varies across the thickness of said electrochromic layer such that at least one local maximum is formed.

2. An electrochromic element as claimed in claim 1, characterized in that the variation of the oxygen content in the electrochromic layer (25) comprises at least two local maxima and a local minimum.

3. An electrochromic element as claimed in claim 1, characterized in that the electrochromic layer (25) comprises a plurality of (25', 25", 25'''), with the variation of the oxygen content in the electrochromic layer (25) occurring predominantly at the location of transitions between two sub-layers.

4. An electrochromic element as claimed in claim 1, characterized in that the metal oxide comprises tungsten oxide $WO_x$.

5. An electrochromic element as claimed in claim 4, characterized in that upon the application of the voltage difference, the electrochromic layer (25) exhibits such a spectral characteristic that the difference between the maximum transmission $T_{max}$ and the minimum transmission $T_{min}$ of the electrochromic element (20) in the visible range is less than 35% of the sum of $T_{max}$ and $T_{min}$, $$\frac{T_{max} - T_{min}}{T_{max} + T_{min}} \leq 0.35.$$

6. An electrochromic element as claimed in claim 4, characterized in that the oxygen content of tungsten oxide $WO_x$ ranges between x=0 and x=3.

7. A display device (1) comprising a display screen (3) and an electrochromic element (9; 20), as claimed in claim 1.

8. A display device comprising a plurality of pixels (41, 41', 41"; 42, 47), which pixels comprise an electrochromic element (20) as claimed in claim 1.

9. A method of manufacturing an electrochromic layer (25) on the basis of a metal oxide selected from the group consisting of tungsten oxide, molybdenum oxide, niobium oxide, manganese oxide and zirconium oxide, and combinations thereof, the transmission properties of the electrochromic layer in the visible range being governed by an applied voltage difference across the electrochromic layer, said electrochromic layer being provided by means of a sputter-deposition process in an evacuated chamber, characterized in that during the provision of the electrochromic layer (25), the oxygen content in the chamber is varied to vary the oxygen content across the thickness of the electrochromic layer.

10. A method as claimed in claim 9, characterized in that, during the deposition process, the oxygen content is varied in such a manner that the variation of the oxygen content in the electrochromic layer (25) comprises at least two local maxima and a local minimum.

11. A method as claimed in claim 9, characterized in that the electrochromic layer (25) provided during the deposition process comprises tungsten oxide $WO_x$.

12. A method as claimed in claim 9, characterized in that during the deposition process, a plurality of sub-layers (25', 25", 25''') is formed, with the variation of the oxygen content in the electrochromic layer (25) occurring predominantly at the location of transitions between two sub-layers.

13. An electrochromic element as claimed in claim 2, characterized in that the electrochromic layer comprises a plurality of sub-layers (25', 25", 25'''), with the variation of the oxygen content in the electrochromic layer occurring predominantly at the location of transitions between sub-layers.

14. An electrochromic element as claimed in claim 5, characterized in that the oxygen content of tungsten oxide $WO_x$ ranges between x=0 and x=3.

15. A method as claimed in claim 10, characterized in that the electrochromic layer provided during the deposition process comprises tungsten oxide $WO_x$.

16. A method as claimed in claim 10, characterized in that during the deposition process, a plurality of sub-layers (25', 25", 25''', ) is formed, with the variation of the oxygen content in the electrochromic layer occurring predominantly at the location of transitions between two sub-layers.

* * * * *